United States Patent [19]

Chadwick et al.

[11] Patent Number: 4,531,408

[45] Date of Patent: Jul. 30, 1985

[54] CONTROL OF ROTOR BLADE STROBOSCOPIC DISPLAY

[75] Inventors: James R. Chadwick, Bradbury; Lloyd N. Johnson, Glendora, both of Calif.

[73] Assignee: Chadwick-Helmuth Company, Inc., El Monte, Calif.

[21] Appl. No.: 447,264

[22] Filed: Dec. 6, 1982

[51] Int. Cl.³ .................. G01M 1/28; G01B 11/26
[52] U.S. Cl. .................................................. 73/455
[58] Field of Search ............. 73/455, 466; 416/61; 356/23

[56] References Cited

U.S. PATENT DOCUMENTS 2,964,849 12/1960 Roccati ............................... 356/23
3,802,273 4/1974 Helmuth et al. ................... 73/455
3,945,256 3/1976 Wilson et al. ...................... 73/455
4,053,123 10/1977 Chadwick ....................... 73/455 X
4,112,774 9/1978 Chadwick ........................... 73/455

FOREIGN PATENT DOCUMENTS 1446960 6/1966 France .................................. 416/61
2,482,720 11/1981 France ................................. 416/61

Primary Examiner—James J. Gill
Attorney, Agent, or Firm—William W. Haefliger

[57] ABSTRACT

The invention concerns method and apparatus to obtain accurate tracking of rotor blades, as for example helicopter rotor blades, despite the existence of conditions transiently altering rotor angular velocity.

16 Claims, 11 Drawing Figures

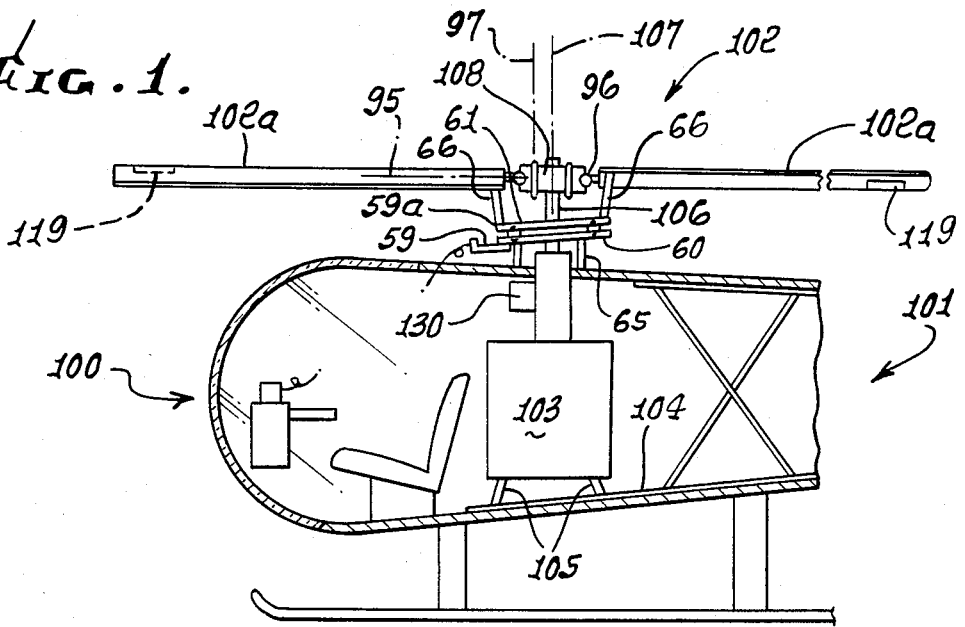
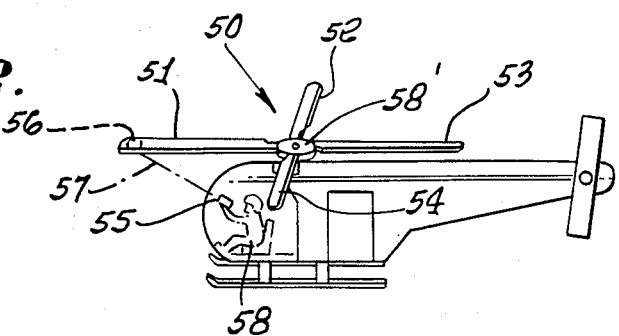
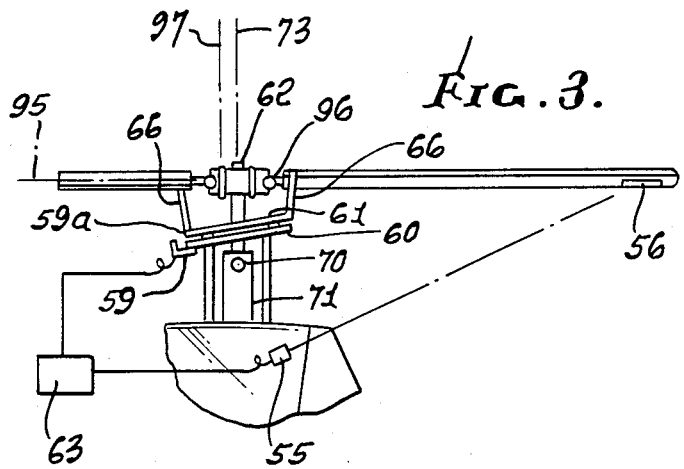
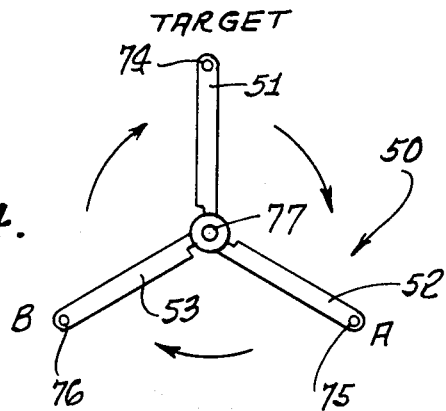

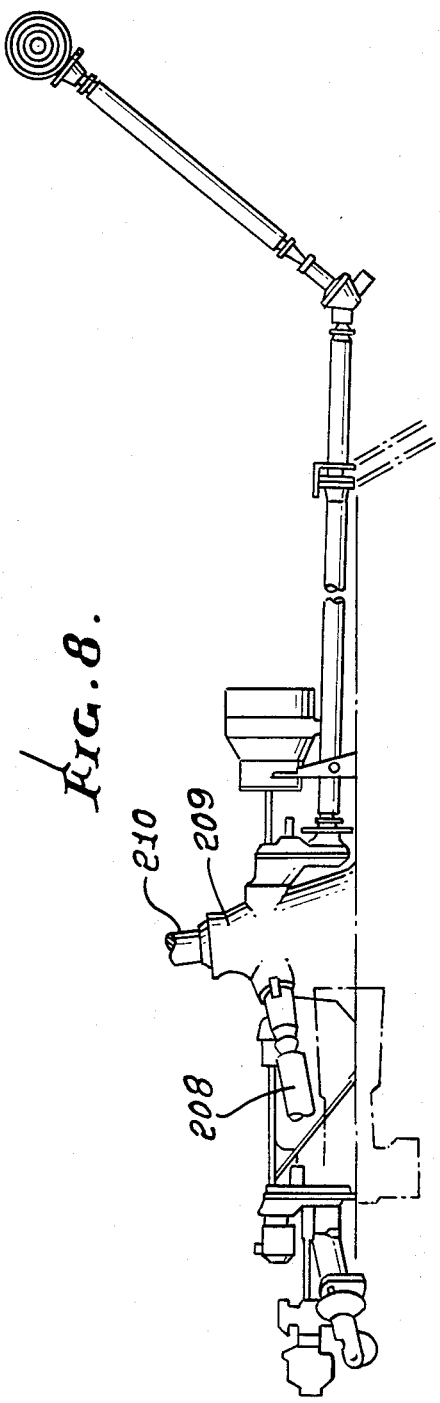
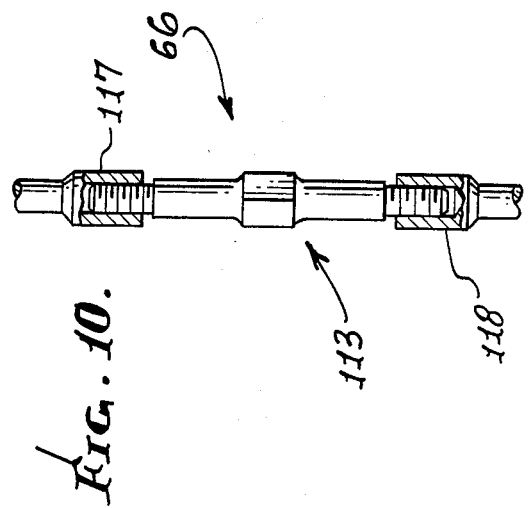
FIG. 8.
FIG. 10.

CONTROL OF ROTOR BLADE STROBOSCOPIC DISPLAY

BACKGROUND OF THE INVENTION

This invention relates to tracking of rotor blades, as for example helicopter rotor blades, and more particularly concern methods and apparatus to obtain accurate tracking despite the existence of conditions transiently altering rotor angular velocity.

The enablement of accurate dynamic smoothing of a rotor, such as a helicopter rotor, depends upon reduction or elimination of rotor blade "out-of-track". The term "track" refers to the requirement that the blade tips (or other corresponding blade portions) pass through the same plane (or fly at the same height) at a given or selected azimuth angle. If one of the two or more blades is above or below the others, it causes a vertical one-per-rev vibration of the "airframe" when the helicopter is in flight. This vibration generally increases as the speed of the helicopter is increased (rotor RPM is generally constant).

The above is true if the blades are "perfect", but sometimes the vertical vibration is less (the ride is better) if the blades are slightly out of track. Since minimum vibration is the objective, one can measure the vertical vibration with an accelerometer and determine not only vibration amplitude, but its phase relative to rotor azimuth position, as sensed by a magnetic pickup or photo cell on the hub (swash plates) of the rotor. A "tracking chart" or programmed calculator can then be employed to enable the user to adjust the track, using pitch link or trim tab, to optimize the ride. See in this regard U.S. Pat. Nos. 4,053,123 and 4,112,774.

A "Strobex" type stroboscope typically is used:
(1) to track rotor blades;
(2) as a phase meter, when triggered from the vibration signal as measured by an accelerometer, which facilitates determination of weight addition locations;
(3) as a speed (RPM) measuring strobe; and
(4) as a strobe to view rotating of vibrating objects in slow motion.

In its tracking mode, it is often slaved to rotor blade rate (rotor RPM times number of blades) via a magnetic pickup secured to the helicopter fixed swash plate, and one interrupter per blade on the rotating swash plate. With each interrupter passage, an electrical pulse from the magnetic pickup causes the Strobex to flash. The magnetic pickup and interrupter are sometimes placed on other non-rotating and rotating members, and they can be replaced with other transducers such as photocell and reflector, etc.

With retro-reflective targets attached to the blade tips, the collimated light from the parabolic reflector and point-source is reflected back to the source (retro-reflected). If the Strobex (light source) is held nearly in front of the viewer's eyes, he sees the tip targets brightly. Because of the short duration of the flash (approximately 10 micro sec) the targets appear stopped, and always at the same azimuth position because of the triggering from the magnetic pickup. Since there is one interrupter per blade, all blades appear superimposed at certain azimuth positions, i.e. with two blades the "pattern" can be seen at 12:00 and 6:00 o'clock, three blades will be seen at 12:00, 4:00 and 8:00, four blades at 12:00, 3:00, 6:00 and 9:00 etc.

With helicopters having 4, 5, 6, or even 7 blades, it is desirable not to have the tip targets superimposed as previously described, but to be able to "spread" the pattern for easy viewing and identification of the targets. In some cases, the interrupters are slightly offset to achieve this effect, but such interrupter placement is very sensitive because they are typically placed at a very short radius, relative to the axis of rotation, and the "leverage" at the large radius of the blade tips (typically 20:1) magnifies any errors in interrupter spacing. Also some swash plate mechanisms do not lend themselves to the mounting of one interrupter per blade.

One approach to this problem was the Chadwick-Helmuth Model 135M-9 Strobex and subsequently the Model 135M-11. They feature a "locking oscillator" set to flash the strobe at the one-per-blade rate, but "restarted" once per revolution by a single interrupter on the rotating member, passing by the fixed magnetic pickup.

It can be seen that a free-running oscillator, set exactly to the blade rate, (no magnetic pickup signal) will show all the blades superimposed at some fixed (but unknown) azimuth position. If the flash rate is slightly changed, all the blades will remain superimposed, but will rotate around the rotor disc, left or right. This is not a useful display because the targets are hard to find and follow, and because they cannot be spread.

If one adjusts the oscillator to flash once-per-blade to be re-started once per revolution, each time the single interrupter passes the magnetic pickup, it can be seen that the targets will always appear at the same azimuth position, and that they will be "stacked" if the flash rate exactly matches the one-per-blade rate. If one reduces the flash rate of the Strobex (increases the interval between flashes), the "master" blade will appear at its fixed azimuth position because the interrupter causes that flash—and starts the oscillator. The following blade will travel further than ¼th of a revolution before the next flash because the flash interval is longer, and that blade's target will appear to the left of the first (the blades travel from right to left, except on French and Russian helicopters). The third blade will travel still farther and its target will appear to the left of the second, and so on. Thus, one can spread the blades or "stack" them, as desired by controlling the decrease of flash rate.

If the Strobex is caused to flash faster than blade rate, the pattern "goes to pieces" because the oscillator causes the light to flash before the locking pulse occurs. The pattern disappears off to the right and is useless.

While such a locking oscillator is advantageous, there is a problem. If rotor RPM transiently changes, as it often does with changes in power as in turns, climbs, descents, wind gusts, etc., the blade pattern will change its spread, or disappear, the same as if the flash rate is changed by the oscillator. Therefore, the user must continuously and "delicately" adjust the flash rate in order to keep the pattern as desired. This requires constant attention and skill, and it is very difficult, and distracting to try to "keep the pattern" in turbulence and during maneuvers (when it is especially desirable to see the targets).

SUMMARY OF THE INVENTION

It is an object of the invention to provide method and means to overcome the above described problems. Basically, the method involves sensing changes in rotor or rotor drive angular velocity (or rotary frequency), and using the latter to adjust the flash rate so as to automatically maintain the selected blade spread or display (for blade identification), thereby removing the need for constant manual readjustment. More generally, the described method is employed during the determination of out-of-track condition of the blades of a rotor driven in rotation by a drive, the rotor and drive subject to transient forces, that tend to vary angular frequency, and includes the steps:

(a) repeatedly displaying corresponding portions of the rotating blades to have selected momentary positions in space, and (b) adjusting the repetition rate of such displaying as a function of transient force induced variation in drive angular frequency caused by the transient forces, thereby substantially to maintain the selected positions in space, azimuthally.

As will be seen, the method may typically include sensing the angular frequency $f_1$ of the drive at a location where $f_1 >> f_2$, where $f_2$ is the angular frequency of the bladed rotor such as a helicopter rotor; the displaying step typically includes operating a stroboscope aimed at light reflecting portions of the blades to display such portions in a selected sequence or "spread"; the stroboscope is typically controlled by an oscillator whose initial output frequency is established once per blade of the rotor by $f_2$ and whose subsequent output frequency is controlled by $f_1$ so as to compensate for transient force induced variation in rotor angular velocity, thereby to maintain the displayed "spread" in a localized zone in space, as viewed from a location near the stroboscope; and accordingly the observer may accurately detect or observe whether and which one or more of the blades is above or below the level of the others, at a selected clock angle, i.e. azimuth relative to the rotor axis, so that its level may be corrected as by appropriate adjustment or weighting.

In its apparatus aspects, the invention contemplates provision of (a) display means for repeatedly displaying corresponding portions of the rotating blades to have selected positions in space, and (b) circuitry operatively connected with the display means for adjusting the repetition rate of the displaying as a function of transient force induced variations in drive angular frequency caused by the transient forces, thereby substantially to maintain such selected positions in space, azimuthally.

Such circuitry may include a first sensor located to sense $f_1$ of the drive, where $f_1 >> f_2$, so that changes in frequency may be detected with higher precision and used to control the oscillator; the circuitry may include a second sensor located at the rotor to detect rotor frequency $f_2$; and both sensors may be coupled to the oscillator controlling the stroboscope, the oscillator having an output frequency f characterized in that the desired "spread" or sequence of the reflecting blade portions created for observation. Further, the circuitry may include a frequency to voltage converter controlled by $f_1$, and controlling a voltage controlled oscillator, the converter having an adjustment means to obtain an initial desired voltage output level corresponding to rotor angular frequency. Also, the oscillator may have an adjustment means to obtain a flash output frequency corresponding to desired spread of the blade reflecting portions.

These and other objects and advantages of the invention, as well as the details of an illustrative embodiment, will be more fully understood from the following specification and drawings, in which:

DRAWING DESCRIPTION

FIG. 1 is a vertical section through a helicopter proximate the main rotor, and looking laterally;

FIG. 2 is a perspective showing of a hovering helicopter;

FIG. 3 is a fragmentary elevation showing a helicopter main rotor head;

FIG. 4 is a plan view of a main rotor;

FIG. 8 is a side elevation of the FIG. 6 power train; and

FIG. 10 is a view showing pitch link adjustment.

DETAILED DESCRIPTION

Figure 5:
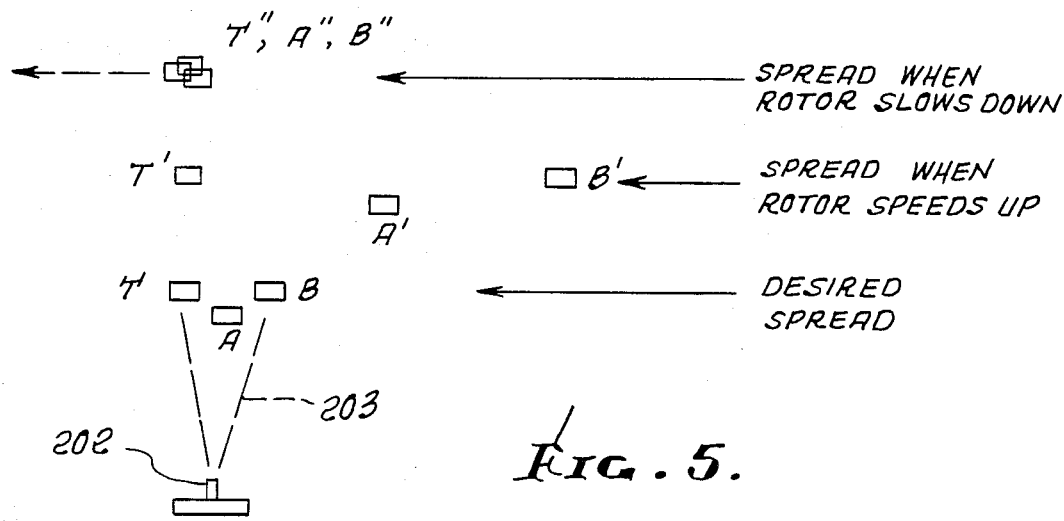
FIG. 5 is a blade target display diagram, in plan view.

Referring now to FIG. 1, the helicopter 100 includes a fuselage 101, a main rotor 102 having two opposed blades 102a, an engine 103 suitably connected with the fuselage framework 104 as at 105, and an engine driven main drive shaft 106 for the rotor. The rotor axis appears at 107, and hub at 108, and elements 59, 59a, 60, 61, 65, 66, 71, 95, 96 and 97 appear as in FIGS. 1 and 2.

Extending the description to FIG. 2, it illustrates balancing of a helicopter main rotor 50. Initially, the main rotor blades 51-54 are tracked to make sure that, as they rotate and pass through any given point in the azimuth, they are at the same level. Out-of-track conditions cause roughness and vibration, affecting the balancing of the rotor unless removed prior to such balancing. Vibration and roughness arising from out-of-track conditions cause vertical and lateral vibration which mask the out-of-balance induced lateral vibration, making it impossible to distinguish the desired signal.

The condition of blade track is first observed with the ship operating as it will be during balancing, i.e. on the ground, or during hovering, as by aiming a stroboscopically operated light source 55 at the rotating blade tip path, the blade tip undersides carrying retroreflective targets 56. Because of the blade spread logic as described above, all targets can be identical. The targets reflect light from the beam 57 back toward the observer 58 inside the helicopter, who sees the bright targets in the sky. The blades are typically identified by numbers, target shape or color, and any misaligned blade can be identified and the degree of misalignment judged. Thereafter, after the helicopter is at rest on the ground, the offending blade can be trim-adjusted back into alignment, as by means commonly provided at the rotor head 58'.

The light source 55 may comprise, for example, a STROBEX Model 135 M-7 or M-11 product of Chadwick-Helmuth Co.,Inc. El Monte, Calif. Its sync signal may be derived from a magnetic pick-up 59 secured to a fixed swashplate 60 (better seen in FIG. 3), the pick-up projecting near a swashplate 61 rotated by main drive shaft 62. Swash plate 61 carries a component such as a soft iron element 59a, which magnetically actuates the pick-up to produce the sync signal, once for each rotor revolution. The sync signal is used to control the stroboscopic lamp 55. Tilt controls for the fixed swashplate are shown at 65 and operated to control pivoting of the rotating blades via pitch control links 66, to provide flight direction control of the helicopter as well as lift control.

As described in U.S. Pat. No. 3,802,263, dynamic balance of the main rotor may then be attained.

Assuming a main rotor 50 having three blades indicated as TARGET, A and B in FIG. 4, the latter may have fixed weight addition or subtraction positions indicated at 74-76. The determination of the amount of weight to be changed at any two of the three positions to overcome dynamic unbalance may be made with the aid of a multicoordinate system as for example is shown in U.S. Pat. No. 4,053,123.

Referring back to FIG. 3, each blade typically may have three axes of rotation designated as the pitch axis 95 extending generally parallel to the blade length, the articulation axis 96 extending generally horizontally and normal to axis 95, and vertical axis 97, suitable joints being provided to facilitate blade rotation about such axes.

In accordance with the invention, and referring to FIGS. 5-8, it will be understood that at times, during flight and while a stroboscope is being used to determine out-of-track condition of the blades, the rotor and drive may be subject to transient forces (wind gusts, fuel control system perturbations, changing rates of climb or descent, or forces produced by the engine governor system) that tend to vary angular frequency of the rotor and hence of the blades. For example, instead of being displayed as at T, A and B, in plan in FIG. 5, the targets may quickly move to differentially spread position such as at T', A' and B' and T", A" and B" spread position for example. The latter depicts blade stacking at various unknown positions. See the further description in the above BACKGROUND discussion. It should be noted that the observed spread sequence is employed to identify the corresponding blades when the targets are identical.

To compensate for this, thereby eliminating the variable spread, the following are provided:
(a) display means for repeatedly displaying corresponding portions of the rotating blades to have selected positions in space, and
(b) circuitry operatively connected with the display means for adjusting the repetition rate of the displaying as a function of transient force induced variations in drive angular frequency caused by such transient forces, thereby substantially to maintain the selected positions in space, relative to the master (target) blade.

Figure 6:
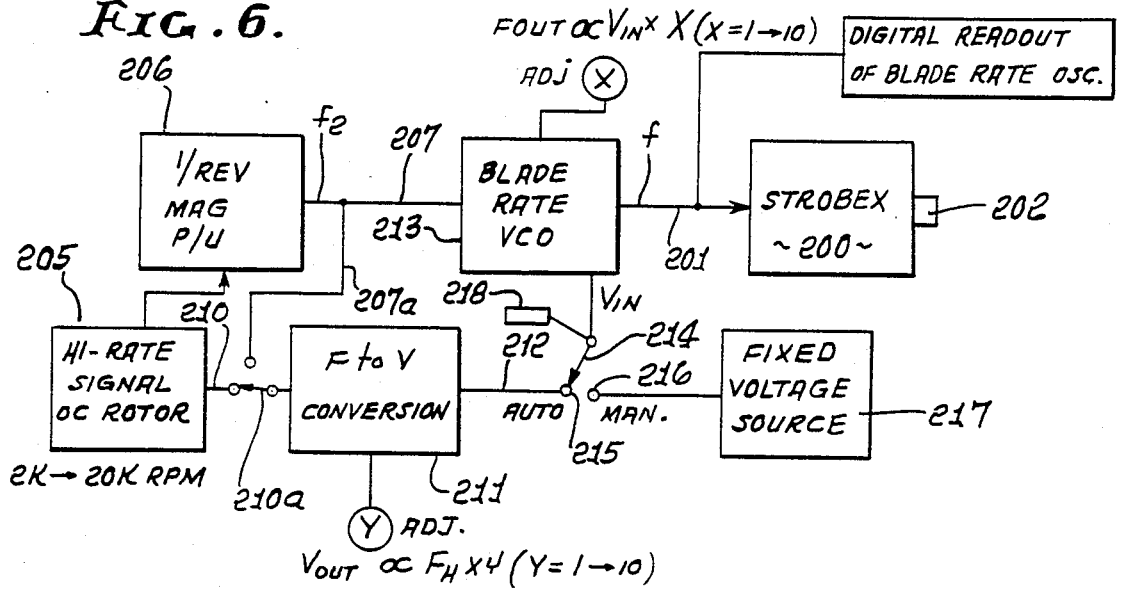
FIG. 6 is a circuit block diagram.
Figure 7:
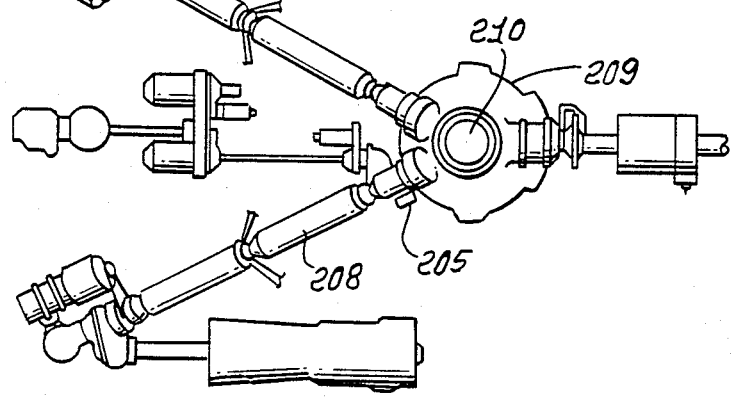
FIG. 7 is a plan view of a helicopter power train.
Figure 9A:
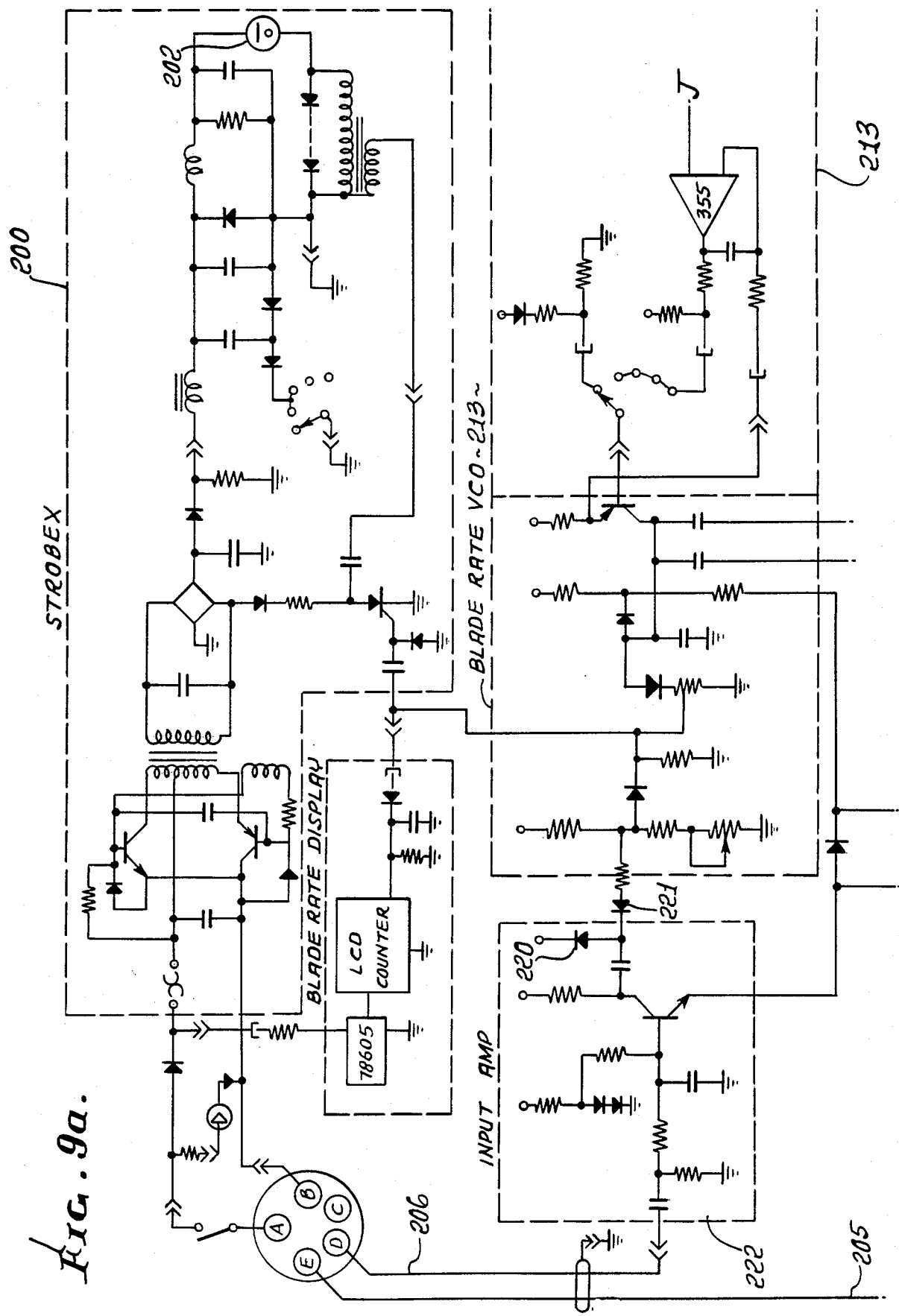
FIGS. 9a and 9b are contiguous parts of a detailed circuit diagram.

More specifically, the display means (a) referred to may comprise a stroboscope indicated at 200 in FIG. 6 and 9 having flash rate controlling input at 201, and a light source 202 which flashes at the frequency rate applied at input 202. FIG. 5 shows the selected, "spread" positions T, A and B of the corresponding target portions of the rotating blades, as produced by the flashing stroboscope beam indicated at 203, the cone angle of the beam not being to scale. Transient forces applied to the rotor produce momentary variations in rotor angular velocity, productive of rapidly shifting target spacing indicated at T', A' and B' as well as T", A" and B" in FIG. 5, which are extremely difficult to comprehend as respects tracking levels of different blades. Note, for example, that blade A is easily seen to be out-of-track (low) relative to blades T and B in pattern T, A and B, but it is difficult to judge the track of positions T", A" and B". An object of the invention is to provide for automatic elimination of the altered spread between T', A' and B' and T", A" and B".

The above mentioned (b) control circuitry connected with the display stroboscope for adjusting the repetition rate as a function of transient force induced variations in drive angular frequency may take the form indicated in FIGS. 6 and 9. As there shown, the circuitry includes a first sensor, as at 205, located to sense the angular frequency $f_1$ of the rotor drive, and characterized in that $f_1 >> f_2$ where $f_2$ is the angular frequency of the rotor itself. A second sensor 206 typically produces a signal voltage 207 of frequency $f_2$ applied to a so-called "rotor rate" VCO (voltage controlled oscillator 213). Sensor 206 corresponds to magnetic pick-up 59 in FIGS. 1 and 2, and $f_2$ may be regarded as a "sync" signal controlling the initial timing of the flash (once each revolution of the rotor) of the stroboscope; the subsequent flash output frequency of the stroboscope, i.e. during a subsequent interval of rotor revolution next following the initial flash, is controlled by changes in $f_1$, as will be described.

The first sensor 205 may likewise comprise a magnetic pick-up, and is located at a drive component having a rotary frequency substantially in excess (as for example 5-10 times as large) as the rotor frequency of rotation. See for example the pick-up 205 in FIGS. 7 and 8 located to sense the rate of rotation of engine driven shaft 208 at the input to gear box 209. The driven rotor shaft is indicated at 210 and corresponds to shaft 62 in FIG. 3. Other pick-up locations may be employed.

Figure 9B:
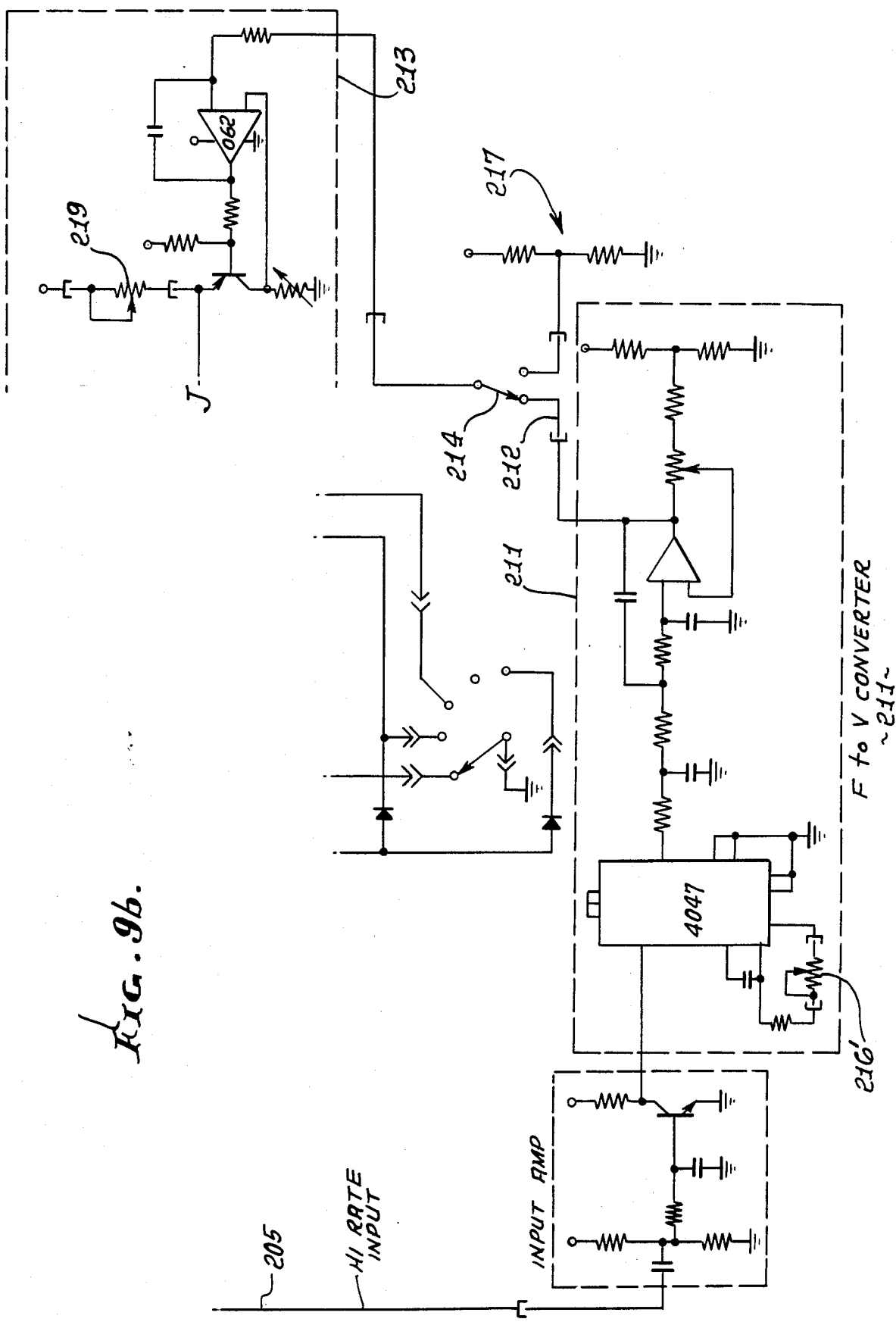

The output at 210 of sensor 205 controls a frequency-to-voltage converter 211 whose voltage output at 212 in turn controls the VCO 213. A manually controllable switch 214 is shiftable between terminals 215 and 216, as shown. When contacting terminal 215, the output 212 of converter 216 is passed to the VCO 213; whereas, when switch arm 214 contacts terminal 216, a fixed voltage from source 217 is applied to the VCO. In this regard, converter 211 may be adjusted at Y to initially vary its voltage output until it equals the fixed voltage from source 217, switch arm 214 being operated, and voltage level detector 218 employed, to achieve the desired output, for normalization purposes. FIG. 9b shows the adjustment having the form of a trim pot 216' connected with circuitry 217.

In FIG. 6, the input signal to converter 211 may be the $f_2$ (once per rev) output from sensor 206, as on line 207a and switch arm 210a.

The VCO 213 is shown to have an adjustment (calibration) means X in FIG. 6 to obtain an output flash frequency "f" approximately equal to the frequency of rotor rotation, thereby to produce a desired target spread pattern. In FIG. 9 that adjustment takes the form of trim pot 219.

Also of importance in FIG. 9 are the two diodes 220 and 221 operatively connected between input amplifier 222 and the VCO 213. They operate to prevent the relatively shorter ramp time period $T_2$ (associated with $f_2$) from affecting the relatively longer ramp time period $T_1$ (associated with $f_1$), the $T_2$ ramp generated by converter 211, and the $T_1$ ramp generated in the VCO 213.

Accordingly, the basic method of the invention is seen to comprise:
(a) repeatedly displaying corresponding portions of the rotating blades to have selected spread positions in space, and
(b) adjusting the repetition rate of said displaying as a function of transient force induced variations in drive angular frequency caused by said transient forces, thereby substantially to maintain said selected positions in space.

As explained in U.S. Pat. Nos. 4,053,123 and 4,112,774, after out-of-track has been eliminated, dynamic balance of the blades can then be obtained. Out-of-track is typically eliminated as by pitch link adjustment of at least one blade, or trim tab adjustment of one or more blades, as explained in U.S. Pat. No. 4,053,123, until the blade target positions T, A and B are in line. See for example rotatable turnbuckle 113 in FIG. 10, to adjust the effective lengths of pitch link sections 117 and 118.

In the above $f_1$ and $f_2$ have a constant ratio (geared) as rotor speed changes.

We claim:

1. In the method of determining out-of-track condition of the baldes of a rotor driven in rotation by a drive, the rotor and drive subject to transient forces that tend to vary angular frequency, the steps that include
    (a) providing a display means and operating same to repeatedly display corresponding portions of the rotating blades to have selected spread positions in space, and
    (b) adjusting the repetition rate of said displaying as a function of transient force induced variation in drive angular frequency caused by said transient forces, thereby substantially to maintain said selected positions in space,
    (c) said (b) step including employing a first sensor located to sense the frequency $f_1$ of the drive at a location where $f_1 >> f_2$, $f_2$ being the angular frequency of the blade rotor,
    (d) said (b) step also including employing a second sensor located to sense $f_2$,
    (e) and using said sensed $f_1$ and $f_2$ to control the display means to have an output whose initial frequency, once each interval related to rotor revolution, is controlled by $f_2$, and whose subsequent frequency following said interval is controlled by $f_1$.

2. The method of claim 1 wherein said displaying includes operating said display means in the form of a stroboscope aimed at said portions of the blades, the stroboscope flashing at said repetition rate.

3. The method of claim 2 wherein said (a) step includes operating an oscillator having an output frequency controlling said stroboscope flash repetition rate, said (b) step including adjusting the output frequency of the oscillator as a function of said sensed $f_1$ and $f_2$.

4. The method of claim 1 wherein said (a) step is carried out to display said blade portions in a selected sequence, in space, in the general direction of blade rotation.

5. The method of claim 4 including observing one of said positions at a level above or below the level or levels of others of said positions, in space, and adjusting the blade corresponding to said one position, to bring said one position back toward said level or levels of the others of said positions.

6. The method of one of claims 1, 2, 3 or 5 wherein the rotor comprises a helicopter rotor.

7. The method of claim 1 which includes the step of mounting the first sensor at a drive location between the rotor and an engine defined by the drive.

8. The method of claim 1 wherein said rotor comprises a helicopter rotor and said drive includes a gear train, said sensing of $f_1$ carried out of said gear train.

9. The method of claim 1 wherein the rotor comprises a helicopter rotor, and said (a) and (b) steps are carried out during helicopter flight.

10. The method of claim 9 wherein said (e) step of claim 1 includes momentarily re-setting the repetition rate of said displaying, once each revolution of the rotor, to equal the helicopter rotor frequency.

11. In apparatus for determining out-of-tract condition of the blades of a rotor driven in rotation by a drive, the rotor and drive being subject to transient forces that tend to vary angular frequency, the combination comprising
    (a) display means for repeatedly displaying corresponding portions of the rotating blades to have selected spread positions in space,
    (b) circuitry operatively connected with said display means for adjusting the rate of said displaying as a function of transient force induced variations in drive angular frequency caused by said transient forces, thereby substantially to maintain said selected positions in space, and
    (c) said (b) circuitry including a first sensor located to sense the angular frequency $f_1$ of the drive at a location where $f_1 >> f_2$, where $f_2$ is the angular frequency of the blade rotor, and including a second sensor located to sense $f_2$, the display means having an output whose initial frequency, once each revolution, is controlled by $f_2$, and whose subsequent frequency during a subsequent interval once each revolution is controlled by changes in $f_1$.

12. The apparatus of claim 11 wherein said display means includes a stroboscope having a flash output aimed at said portions of the rotating blades.

13. The apparatus of claim 11 wherein said display means includes a stroboscope aimed at said portions of the rotating blades, and said (b) circuitry includes an oscillator operatively connected in flash frequency controlling relation with the stroboscope, said sensors operatively connected with the oscillator.

14. The apparatus of claim 13 wherein said oscillator has an output frequency f characterized in that said selected positions of the blade portions are in a selected spaced apart sequence, in space, in the general direction of blade rotation.

15. The apparatus of claim 13 wherein said circuitry includes a frequency to voltage converter connected in series between said first sensor and said oscillator, and the oscillator is a voltage controlled oscillator, said converter having adjustment means to obtain an initial desired voltage output level.

16. The apparatus of claim 15 wherein said voltage controlled oscillator has adjustment means to obtain a flash output frequency corresponding to a desired blade spread pattern of said blade portions.

* * * * *